Dec. 19, 1944.  A. P. ANDERSON  2,365,149
FILTER AND DRIER
Filed Sept. 22, 1942
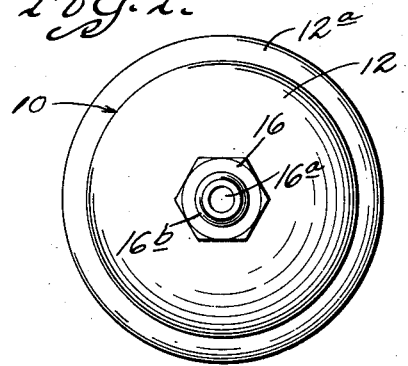
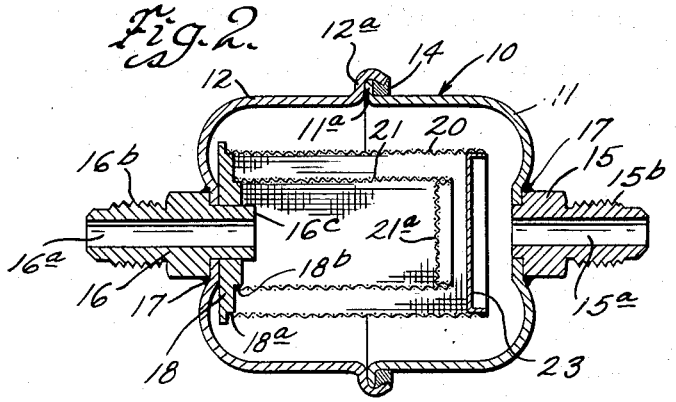
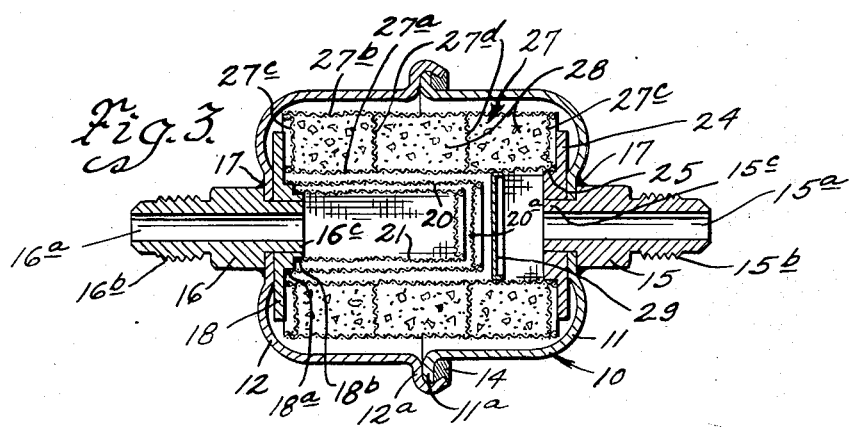
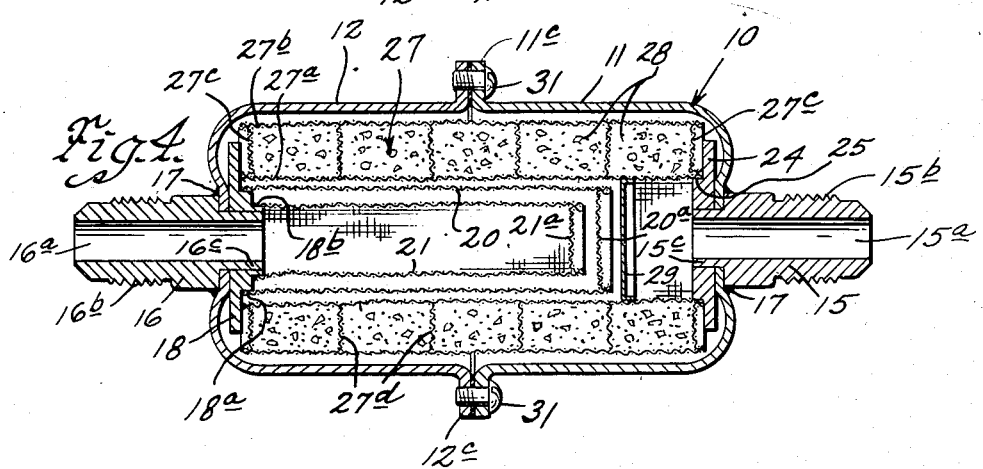
Inventor
August P. Anderson
by Bair & Freeman
Attys.

Patented Dec. 19, 1944

2,365,149

UNITED STATES PATENT OFFICE 2,365,149

FILTER AND DRIER

August P. Anderson, Goshen, Ind., assignor to Penn Electric Switch Co., Goshen, Ind., a corporation of Iowa Application September 22, 1942, Serial No. 459,227

9 Claims. (Cl. 210—139)

This invention relates to improvements in filters and driers for use in liquid supply systems. While the present invention is adapted for use in a relatively wide field, it is especially suitable for use in refrigeration systems for removing solid particles of foreign matter from the liquid, and also collecting and removing water or water vapor from the liquid gases in the system. It has long been recognized that small solid particles of foreign matter, in the refrigeration systems, often cause considerable difficulty, and particularly at the needle valves in such systems. It is also well-known that the presence of an excessive amount of water or water vapor in admixture with the liquid gas greatly impairs the efficiency of the system.

One of the objects of this invention is to provide an improved filter of the character indicated, which is relatively simple in construction, durable and efficient in use, and capable of being economically manufactured.

Another object is to provide a novel drier or dehydrator device for efficiently removing water and water vapor from an admixture thereof with other liquids.

A further object of this invention is to provide a novel unitary combination filter and drier for efficiently removing solid particles of foreign matter from the liquid and removing water and water vapor from admixture with other liquids.

Still another object is to provide an improved drier or dehydrator unit of the character indicated which is of a simplified, economical construction, so constructed and arranged as to permit quick and easy replacement of the cartridge containing material having an affinity for water and water vapor.

With these and other objects in view, my invention consists in the construction, arrangement and combination of the various parts of my device whereby the objects contemplated are attained, as hereinafter more fully set forth, pointed out in my claims and illustrated in the accompanying drawing, wherein:

Figure 1 is a view in end elevation of the improved filter device embodying the present invention;

Figure 2 is an axial longitudinal section through the filter device;

Figure 3 is an axial section through my novel combination filter and drier device, embodying the present invention; and Figure 4 is an axial section through a modified form of the combined filter and drier device which is constructed for quick and easy dismantling for removal and replacement of the cartridge containing material having an affinity for water and water vapor.

In the construction illustrated in Figures 1 and 2 of the drawing the filter device includes a housing 10 composed of two sheet metal stamped elements 11 and 12 of substantially identical contour and of generally cup-shaped formation. The open ends of the elements 11 and 12 are disposed in abutting relation and are formed with laterally extending flanges 11$^a$ and 12$^a$ respectively, the flange 12$^a$ being of greater lateral extent than the flange 11$^a$ for crimping around said flange 11$^a$ for securing the two elements 11 and 12 together, as seen in Figure 2 of the drawing.

In a device of this type it is essential that all joints be adequately sealed to preclude leakage, and in this connection a ring of solder, as indicated at 14, is disposed between the rear face of the flange 11$^a$ and the terminal end of the flange 12$^a$, as seen in the drawing.

The cup-shaped housing elements 11 and 12 are formed with aligned openings in which are press-fitted inlet and outlet fittings, designated at 15 and 16 respectively. Said fittings are provided with ducts 15$^a$ and 16$^a$ respectively, which are in direct communication with the interior of the chamber formed within the housing elements. The outer ends of the respective fittings are threaded, as indicated at 15$^b$ and 16$^b$, respectively, for connection to suitable conduits of the liquid supply system. Said fittings 15 and 16 are sealed with respect to the housing elements by a ring of solder, as indicated at 17.

The outlet fitting 16 has a terminal portion 16$^c$ projecting a substantial distance inwardly of the housing element 12, and press-fitted on said projecting portion is a disk-like member 18 which is provided with a pair of concentric shoulders 18$^a$ and 18$^b$. Supported on the disk-like member 18 are filter screens 20 and 21, of cylindrical form, disposed in telescoped relation to each other. These screens are preferably formed of suitable mesh material, such as wire gauze, and have their corresponding ends seated and supported upon the respective shoulders 18$^a$ an 18$^b$ of the disk-like member 18, with the wall of the outer screen 20 disposed in spaced relation to the wall of the housing. Said ends of the cylindrical mesh screens may be rigidly attached to the member 18 in any suitable manner, such as by spot-welding. The outer end of the inner screen 21 is closed by similar mesh material, as indicated at 21$^a$, and the outer end of the outer screen 20 is closed by a baffle 23 which, as may be seen in the drawing, is disposed adjacent and substantially centrally with respect to the inlet duct 15$^a$. The purpose of the baffle 23 is to deflect the liquid supplied through the inlet duct 15$^a$ in a lateral direction so as to obtain maximum volumetric distribution of the liquid around the screens for filtering therethrough, prior to discharging through the outlet duct 16$^a$.

It is to be understood that the mesh openings of the inner cylindrical screen 21 are smaller than the mesh openings of the outer screen 20. By this arrangement the larger particles of solid matter are trapped against the outer surface of the outer screen 20, and smaller particles of solid foreign matter are caused to lodge against the outer surface of the inner screen 21, and thus effectively strain the liquid of solid particles of foreign matter from the system.

In the construction illustrated in Figure 3 of the drawing, the device is substantially of the same form as illustrated in Figure 2 of the drawing, except that the filter screens are of slightly smaller diameter, and the outer end of the outer screen 20 is closed by an end panel 20ª of mesh material of the same nature as the body of said screen. In this construction the inlet fitting 15 is provided with an extension 15ᶜ projecting a short distance interiorly of the housing, and press-fitted upon said extension is a disk-like member 24 formed with an annular shoulder 25, upon which is seated and supported a cylindrical, annular cartridge, indicated generally at 27, which is disposed in spaced relation to the wall of the housing. This cartridge is made of suitable mesh material, such as wire cloth, including inner and outer walls 27ª and 27ᵇ, and end walls 27ᶜ. The cartridge 27 contains a suitable form of drier material, such as silica gel, as indicated at 28, having the ability to absorb and retain water and water vapor. To insure relatively uniform distribution of the particles of the silica gel within the cartridge, I provide a plurality of partition walls 27ᵈ so as to, in effect, divide up the annular area within the cartridge into a plurality of small annular areas. This arrangement tends to prevent the crystals of silica gel from lodging or packing at one end of the cartridge 27, and thus maintaining a more uniform distribution of the crystals.

A baffle, indicated at 29, is fixedly secured in the central opening of the cartridge, adjacent the end of the inlet duct, as seen in Figure 3 of the drawing, so that the liquid being discharged into the housing through the inlet duct 15ª, is deflected laterally and caused to flow through and around the mass of crystals of silica gel. The liquid, upon coming into contact with the crystals of silica gel, is caused to give up its water, which is absorbed and retained by the crystals, and the remaining liquid then passes through the filter screens 20 and 21, and incident to which the solid particles of foreign matter in the liquid are removed therefrom prior to discharge of the liquid through the outlet duct 16ª.

The devices represented in Figures 2 and 3 of the drawing are suitable for use in connection with domestic refrigeration systems.

In the modified construction represented in Figure 4 of the drawing, the parts are of substantially the same general construction as the corresponding parts in Figure 3 of the drawing, with the exception that the housing elements 11 and 12, filter screens 20 and 21 and cartridge 27 containing the drier material are of increased length. The function of the device in general, is exactly as described in connection with the structure shown in Figure 3 of the drawing.

In this construction, the housing elements 11 and 12 have their flanges 11ᶜ and 12ᶜ formed identically, and disposed in abutting relation, with a sealing gasket 30 interposed therebetween. Said flanges 11ᶜ and 12ᶜ are detachably connected together by a plurality of screws 31 so as to permit quick and easy separation of the housing elements for enabling quick and easy replacement of the cartridge 27, containing the drier material.

Devices of the type represented in Figure 4 of the drawing are of a size which are particularly adapted for use in connection with commercial refrigeration systems.

Some changes may be made in the arrangement and construction of the various parts of my filter and drier, without departing from the real spirit and purpose of my invention, and it is my intention to cover by my claims, any modified forms of structure, or use of mechanical equivalents, which may be reasonably included within their scope.

I claim as my invention:

1. In a device of the character described, a sealed housing, inlet and outlet fittings connected in alignment in opposite wall portions of the housing, each of said fittings having a duct communicating with the interior of the housing and having an outer end portion adapted for connection to a conduit, and a dehydrator element including a closed annular body of mesh material mounted in spaced relation to the walls of the housing with the opposite ends seated around the respective inlet and outlet ducts, a mass of water absorbing material in said annular body, and a baffle mounted within said annular body in registration with the inlet duct for deflecting the liquid laterally and causing it to pass through said mass of material prior to discharge through the outlet duct.

2. In a device of the character described, a sealed housing, inlet and outlet fittings connected in alignment in opposite wall portions of the housing, each of said fittings having a duct communicating with the interior of the housing and having an outer end portion adapted for connection to a conduit, and a dehydrator element including a closed annular body of mesh material mounted in spaced relation to the walls of the housing with the opposite ends seated around the respective inlet and outlet ducts, a mass of silica gel crystals disposed in said annular body, and a baffle mounted within said annular body in registration with the inlet duct for deflecting the liquid laterally and causing it to pass through said crystals prior to discharge through the outlet duct.

3. In a device of the character described, a sealed housing, inlet and outlet fittings connected in alignment in opposite wall portions of the housing, each of said fittings having a duct communicating with the interior of the housing and having an outer end portion adapted for connection to a conduit, and a dehydrator element including a closed annular body of mesh material mounted in spaced relation to the walls of the housing with the opposite ends seated around the respective inlet and outlet ducts, said body being provided with a plurality of mesh partitions to divide said body into a plurality of separate annular chambers disposed immediately adjacent one another, a mass of water absorbing material in each of said chambers, a baffle mounted within said body in registration with the inlet duct for deflecting the liquid laterally and causing it to pass through said material prior to discharge through said outlet duct.

4. In a dehydrator and filter device, the combination of a housing, inlet and outlet fittings connected to opposite wall portions of the housing, each of said fittings having a duct communicating with the interior of the housing and having an outer end portion adapted for connection to a conduit, a dehydrator element including a closed annular body of mesh material mounted within the housing with its opposite ends seated around the respective inlet and outlet ducts, a mass of water absorbing material in said body, and a baffle mounted within the body adjacent and in registration with the inlet duct for deflecting the liquid laterally for passage through said material prior to discharge through the outlet duct, and a filter element including a closed end cylinder of mesh material, disposed within the central opening of the dehydrator mesh body, in spaced apart relation to said dehydrator mesh body, and having its open end seated around the outlet duct.

5. In a dehydrator and filter device, the combination of a housing, inlet and outlet fittings connected to opposite wall portions of the housing, each of said fittings having a duct communicating with the interior of the housing and having an outer end portion adapted for connection to a conduit, a dehydrator element including a closed annular body of mesh material mounted within the housing with its opposite ends seated around the respective inlet and outlet ducts, a mass of water absorbing material in said body, and a baffle mounted within the body adjacent and in registration with the inlet duct for deflecting the liquid laterally for passage through said material prior to discharge through the outlet duct, and a filter element including a pair of closed end cylinders of mesh material, disposed one within the other, in the central opening of the dehydrator mesh body, said cylinders and mesh body being disposed in spaced apart relation to each other, the open ends of said mesh cylinders being seated around the outlet duct for insuring passage of liquid from the dehydrator material through the mesh walls of the cylinders prior to discharge through the outlet duct.

6. In a dehydrator and filter device, the combination of a housing, inlet and outlet fittings connected to opposite wall portions of the housing, each of said fittings having a duct communicating with the interior of the housing and having an outer end portion adapted for connection to a conduit, a dehydrator element including a closed annular body of mesh material mounted within the housing with its opposite ends seated around the respective inlet and outlet ducts, a mass of water absorbing material in said body, and a baffle mounted within the body adjacent and in registration with the inlet duct for deflecting the liquid laterally for passage through said material prior to discharge through the outlet duct, and a filter element including a pair of closed end cylinders of mesh material, disposed one within the other, in the central opening of the dehydrator mesh body, said cylinders and mesh body being disposed in spaced apart relation to each other, the mesh openings of the inner cylinder being smaller than the mesh openings of the outer cylinder, the open ends of said mesh cylinders being seated around the outlet duct for insuring passage of liquid from the dehydrator material through the mesh walls of the cylinders prior to discharge through the outlet duct.

7. In a dehydrator and filter device, the combination of a housing, inlet and outlet fittings connected to opposite wall portions of the housing, each of said fittings having a duct communicating with the interior of the housing and having an outer end portion adapted for connection to a conduit, a dehydrator element including a closed annular body of mesh material mounted within the housing with its opposite ends seated around the respective inlet and outlet ducts, a mass of water absorbing material in said body, and a baffle mounted within the body adjacent and in registration with the inlet duct for deflecting the liquid laterally for passage through said material prior to discharge through the outlet duct, a filter element including a closed end cylinder of mesh material, disposed within the central opening of the dehydrator mesh body in spaced apart relation to said dehydrator mesh body, and having its open end seated around the outlet duct, and a pair of disc-like members mounted on the inner ends of said fittings, said member on the inlet fitting being formed with a shoulder to provide a seat and support for the dehydrator element, and the member on the outlet fitting being formed with a shoulder to provide a seat and support for the cylindrical mesh filter element.

8. In a dehydrator and filter device, the combination of a housing, inlet and outlet fittings connected to opposite wall portions of the housing, each of said fittings having a duct communicating with the interior of the housing and having an outer end portion adapted for connection to a conduit, a dehydrator element including a closed annular body of mesh material mounted within the housing with its opposite ends seated around the respective inlet and outlet ducts, a mass of water absorbing material in said body, and a baffle mounted within the body adjacent and in registration with the inlet duct for deflecting the liquid laterally for passage through said material prior to discharge through the outlet duct, a filter element including a pair of closed end cylinders of mesh material, disposed one within the other, in the central opening of the dehydrator mesh body, said cylinders and mesh body being disposed in spaced apart relation to each other, the open ends of said mesh cylinders being seated around the outlet duct for insuring passage of liquid from the dehydrator material through the mesh walls of the cylinders prior to discharge through the outlet duct, and a pair of disc-like members mounted on the inner ends of said fittings, said member on the inlet fitting being formed with a shoulder to provide a seat and support for the dehydrator body, and the member on the outlet fitting being formed with two concentric shoulders to provide seats and support for said two mesh cylinders.

9. In a dehydrator and filter device, the combination of a housing composed of two detachably connectable elements, inlet and outlet fittings connected to opposite wall portions of the housing, each of said fittings having a duct communicating with the interior of the housing and having an outer end portion adapted for connection to a conduit, a dehydrator element including a closed annular body of mesh material mounted within the housing with its opposite ends seated around the respective inlet and outlet ducts, a mass of water absorbing material in said body, and a baffle mounted within the body adjacent and in registration with the inlet duct for deflecting the liquid laterally for passage through said material prior to discharge through the outlet duct, and a filter element including a closed end cylinder of mesh material, disposed within the central opening of the dehydrator mesh body, in spaced apart relation to said dehydrator mesh body, and having its open end seated around the outlet duct.

AUGUST P. ANDERSON.